United States Patent
Beutlrock et al.

(10) Patent No.: US 9,386,879 B2
(45) Date of Patent: Jul. 12, 2016

(54) HOLDER FOR A SERVICE FUNCTION OBJECT

(75) Inventors: Maximilian Beutlrock, Kienberg (DE);
Peter Brezovnik, Mozirje (SI); Jürgen Fritz, Traunstein (DE); Henrik Pavlovic, Slowenien (SI); Aleksander Sedovsek, Mozirje (SI); Igor Zibret, Smartno ob Paki (SI)

(73) Assignee: BSH Hausgeraete GmbH, Munich (DE)

( * ) Notice: Subject to any disclaimer, the term of this patent is extended or adjusted under 35 U.S.C. 154(b) by 1124 days.

(21) Appl. No.: 12/519,227

(22) PCT Filed: Nov. 21, 2007

(86) PCT No.: PCT/EP2007/062616
§ 371 (c)(1),
(2), (4) Date: Jun. 15, 2009

(87) PCT Pub. No.: WO2008/077694
PCT Pub. Date: Jul. 3, 2008

(65) Prior Publication Data
US 2010/0058932 A1    Mar. 11, 2010

(30) Foreign Application Priority Data
Dec. 21, 2006    (DE) .................. 10 2006 060 745

(51) Int. Cl.
| A47J 31/44 | (2006.01) |
| A23F 3/00 | (2006.01) |
| A23F 5/00 | (2006.01) |
| A47J 31/60 | (2006.01) |
| A47J 31/46 | (2006.01) |
| A47J 31/40 | (2006.01) |

(52) U.S. Cl.
CPC ........ *A47J 31/60* (2013.01); *A47J 31/46* (2013.01); *A47J 31/401* (2013.01)

(58) Field of Classification Search
CPC ....... A47J 31/46; A47J 31/005; A47J 31/057; A47J 31/401; B65D 85/8043; A47G 19/16
USPC ................. 99/290, 295, 279, 300, 323.3, 323
See application file for complete search history.

(56) References Cited

U.S. PATENT DOCUMENTS

| 5,297,596 | A * | 3/1994 | Anson ............................ 141/98 |
| 5,551,988 | A * | 9/1996 | Reyhanloo et al. .......... 134/22.1 |
| 6,820,535 | B2 * | 11/2004 | Fischer ...................... 99/289 R |
| 6,948,420 | B2 * | 9/2005 | Kirschner et al. .............. 99/295 |
| 7,017,595 | B2 * | 3/2006 | Jager ............................ 134/25.2 |
| 2002/0083543 | A1 * | 7/2002 | Geiger et al. .................. 15/222 |
| 2003/0145736 | A1 * | 8/2003 | Green ............................. 99/280 |
| 2004/0118291 | A1 * | 6/2004 | Carhuff et al. ................. 99/275 |

(Continued)

FOREIGN PATENT DOCUMENTS

| DE | 20312092 U1 | 11/2003 |
| DE | 20312094 U1 | 11/2003 |
| EP | 1371312 B1 | 10/2005 |

*Primary Examiner* — Dana Ross
*Assistant Examiner* — Hemant Mathew
(74) *Attorney, Agent, or Firm* — Laurence A. Greenberg; Werner H. Stemer; Ralph E. Locher

(57) ABSTRACT

A hot drinks machine is provided that is configured to perform a cleaning program and a descaling program, both of which require the use of a service function object. The hot drinks machine is formed with a holder for the service function object.

11 Claims, 3 Drawing Sheets

(56) References Cited

U.S. PATENT DOCUMENTS

| | | | |
|---|---|---|---|
| 2004/0244600 A1* | 12/2004 | Lalanne-Eygun | 99/279 |
| 2005/0061158 A1* | 3/2005 | Della Pietra et al. | 99/279 |
| 2005/0095158 A1* | 5/2005 | Kirschner et al. | 417/572 |
| 2006/0037483 A1* | 2/2006 | Kief | 99/295 |
| 2006/0144244 A1* | 7/2006 | Girard et al. | 99/295 |
| 2006/0201329 A1* | 9/2006 | Lynch | 99/275 |
| 2006/0249030 A1* | 11/2006 | Bienvenu et al. | 99/291 |
| 2007/0062375 A1* | 3/2007 | Liverani et al. | 99/279 |
| 2008/0023034 A1* | 1/2008 | Hirao et al. | 134/11 |

\* cited by examiner

HOLDER FOR A SERVICE FUNCTION OBJECT

BACKGROUND OF THE INVENTION

The invention relates to a hot drinks machine having a cleaning program and if appropriate a descaling program (service program) which requires the use of at least one service function object. Examples of hot drinks machines include a fully automatic coffee machine, a pad machine or a multibeverage device for the preparation of various hot drinks. A service function object in this application means an object that is necessary for the service function, or for cleaning or descaling and which is to be inserted into a function unit of the machine during execution of a service program. It can be a cleaning or descaling means which chemically supports the service process. However, it can also be a disk which in newer machines is inserted into the brewing chamber and which contains execution information for the service operation.

A hot drinks machine is for example set out in EP 1 483 994 B1. This involves a filter coffee machine which heats water from a water reservoir and supplies it to a coffee filter through a riser. From there the ready coffee flows back into a drinks vessel. The coffee machine must be cleaned and descaled as necessary. This can be done with the help of standard household cleaners and descalers, for example vinegar, or with cleaners and/or descalers specially manufactured for coffee machines. In the case of higher-quality hot drinks machines, especially fully automatic coffee machines, only special service function objects can be used. The cleaning and/or descaling process is repeated at longer intervals, depending on the water hardness and the frequency with which the device is used. Generally however the necessary service function objects are then not available at the time when they are needed.

BRIEF SUMMARY OF THE INVENTION

It is hence the object of the invention to specify a place where service function objects can be kept, so that they are to hand at all times.

In the case of the hot drinks machine mentioned in the introduction, this object is inventively achieved in that a holder for the service function objects, thus for example the descaler and if appropriate the cleaner, is arranged on or in the machine. A holder can for example be a drawer, a pocket or a tubular holder. Since the service function objects are mostly welded in plastic and as a result are protected against soiling and in particular again the absorption of moisture, the holder can be very simple in design. The invention in any case follows the principle of arranging an apparatus on the machine which places the service function objects directly on the device, so that they are to hand at all times. The frequent need to search for the objects is thus obviated.

According to an advantageous embodiment of the invention the holder is a pocket. Compared to a drawer, it has the advantage that it simplifies operation. Unlike a drawer, it does not need to be opened first in order to remove a service function object. An operating step is thus omitted. Another advantage of the pocket compared to a drawer is that it does not necessary require extra space. It can more easily be accommodated at a position in the housing at which there is in any case still free space available.

According to another advantageous embodiment of the invention, the pocket is closed. In other words, it is covered and is thus protected from soiling, in particular from collecting dust. In addition a covered pocket does not disturb the visual appearance of the machine. The service function objects do not in fact need to be kept visible, since they are not necessary each time the hot drinks machine is operated and are not used for the direct working thereof To obviate the need for an additional flap, the pocket is reversibly covered by a hinged or removable component of the drinks machine, advantageously by a removable water reservoir. In other words, the pocket is for example situated behind the water reservoir and is hidden by it as soon as said reservoir is placed on the machine for its intended purpose. The water reservoir must be removed for cleaning or descaling the device in any case, so that the one or more service function objects required can easily be removed at that time. Thus no additional operating step is required for their removal.

According to another advantageous embodiment of the invention the pocket is adapted to the shape of the service function objects. In this way the intended storage space can only be used for the corresponding service function objects and not for anything else. Other objects, such as measuring spoons or coffee filters for example, will not fit into this pocket. In addition, such a pocket does not require more space than necessary and it is possible to see at a glance whether the service function objects are present. For instance, when removing the water tank it is immediately apparent whether a service function object is being stored.

Special hot drinks machines require portions of drink substrate to be loaded in the form of so-called drink disks. The disks also contain information for controlling the machine during preparation of the drink. The use of a special service disk as a service function is also necessary for a cleaning program, since it conveys control information for cleaning to the machine. According to another advantageous embodiment of the invention, the holder is to therefore adapted to the disk shape in the case of such a hot drinks machine. This can be done for one, two or more disks, as required. The shape of the holder thus indicates its purpose immediately. Any use other than the one intended is thus largely excluded.

According to another advantageous embodiment of the invention the holder is adapted to contain two service disks, one for descaling and one for cleaning. The disks consist of a disk-shaped guide section and a capsule area placed concentrically thereon. The capsule section of the service disks is smaller than that of the drinks disks. This makes it impossible to mix the disks up when placing them in the pocket, since the larger drinks disks do not fit into the pocket designed for the smaller service disks.

BRIEF DESCRIPTION OF THE DRAWINGS

The principle of the invention is explained in more detail in the following by way of example on the basis of a drawing, in which.

DETAILED DESCRIPTION OF THE PRESENT INVENTION

Figure 1:
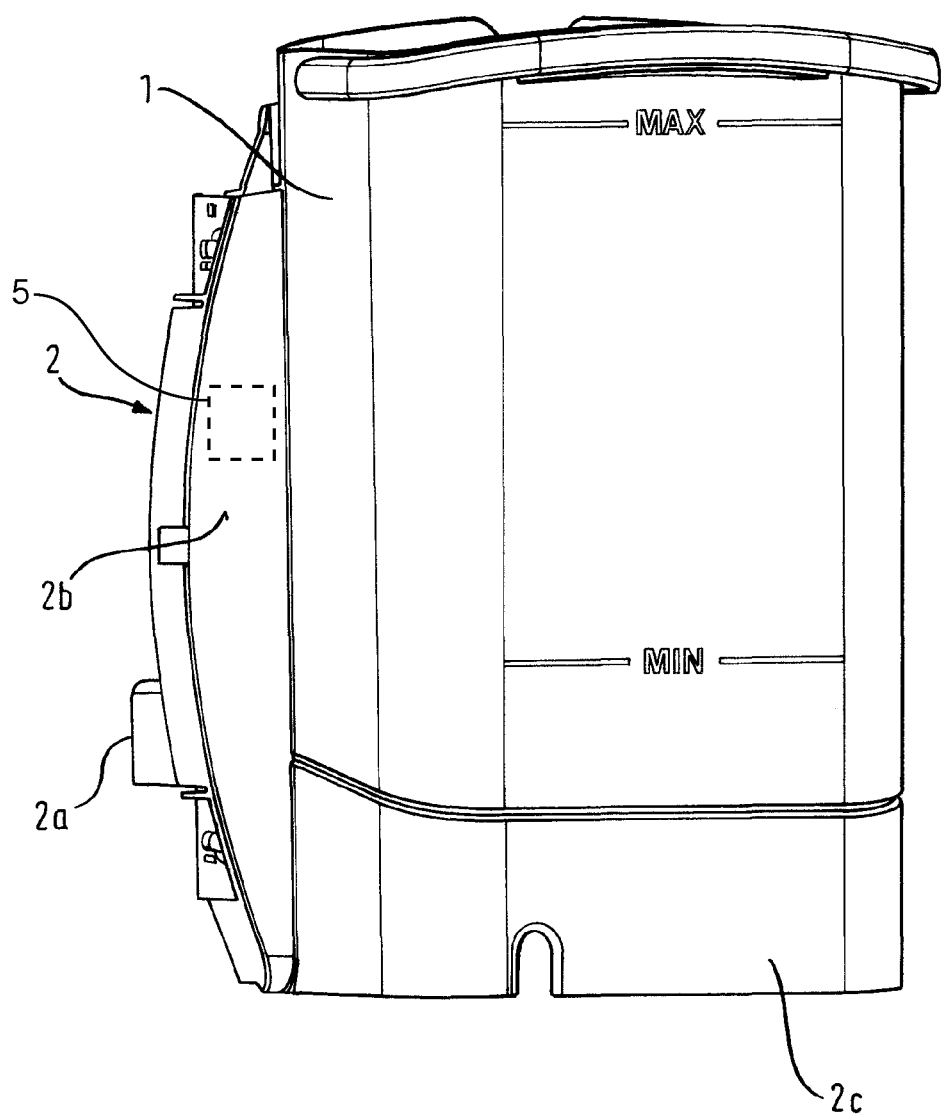
FIG. 1 shows a hot drinks machine with a disk system from the rear in a perspective view.

FIG. 1 shows a hot drinks machine with a disk system from the rear in a perspective view. The machine comprises a removable water reservoir 1 and a housing 2. It has a front housing part 2*a*, a rear housing wall 2*b* and a housing base 2*c*.

The front housing part 2a is only shown in diagrammatic form in the illustration. The precise design is irrelevant for the invention. The water reservoir 1 is placed on the housing base 2c and is retained there in front of the rear housing wall 2b of the front housing part 2a. In the rear housing wall 2b is a pocket 3 (cf. FIG. 2) as a holder for a service function object. It cannot be seen in FIG. 1 because it is covered by the water reservoir 1.

Figure 2:
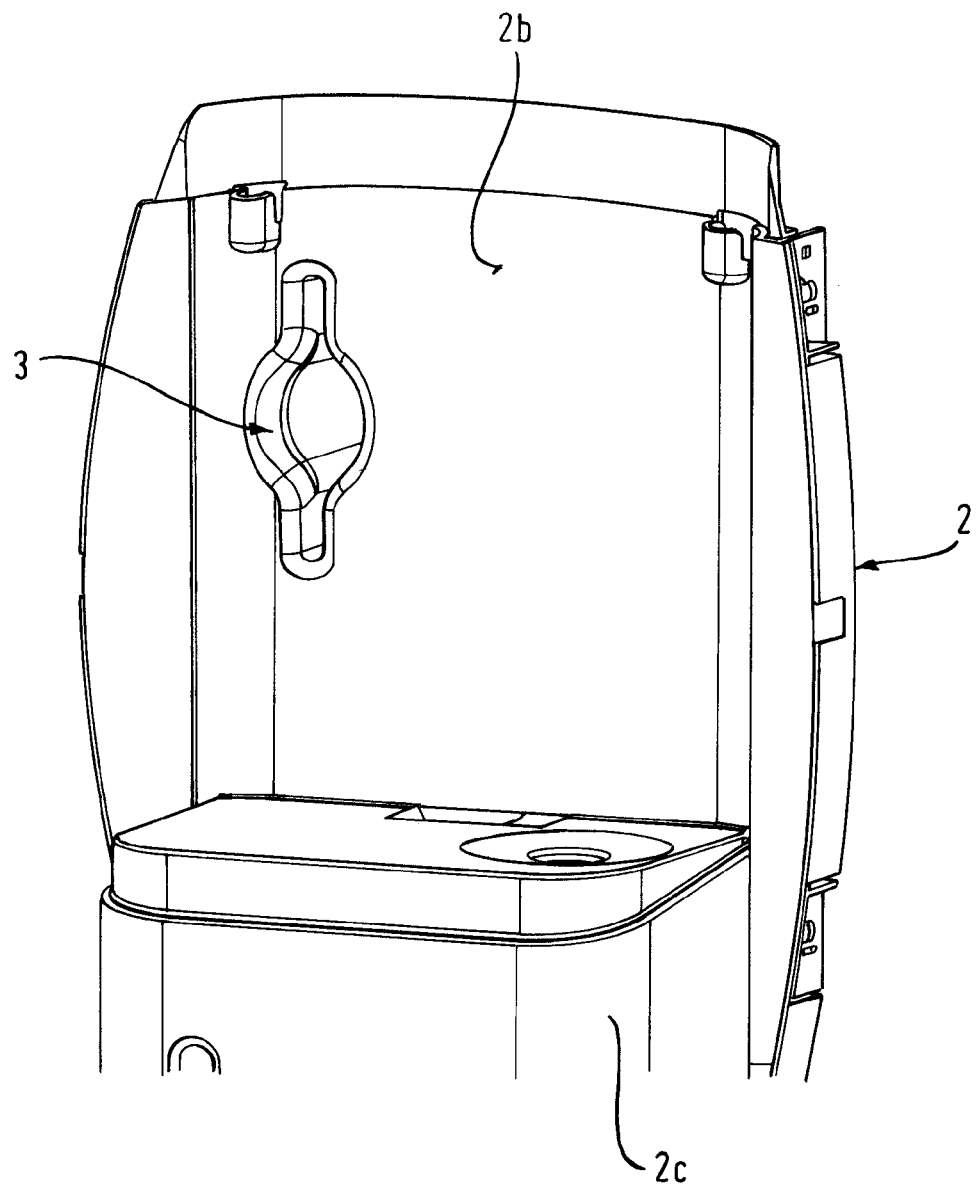
FIG. 2 shows the hot drinks machine from the rear, with the water reservoir removed.

FIG. 2 shows the hot drinks machine from the rear, with the water reservoir 1 removed. At the top left in the rear housing wall 2b is the inventive pocket 3 for two service disks 4 (cf. FIG. 3) as service function objects. It is integrated into the rear housing wall 2b in a position where free space is still available behind the rear housing wall 2b within the housing 2. The pocket 3 can only be accessed if the water reservoir 1 is removed. This can be taken for granted, because when using the service disks 4 to clean or descale the drinks machine the water reservoir 1 has in general to be removed in any case. Thus the position of the pocket 3 in the rear housing wall 2b does not hinder the operation of the drinks machine. Moreover it does not detract from its visual appearance either.

Figure 3:
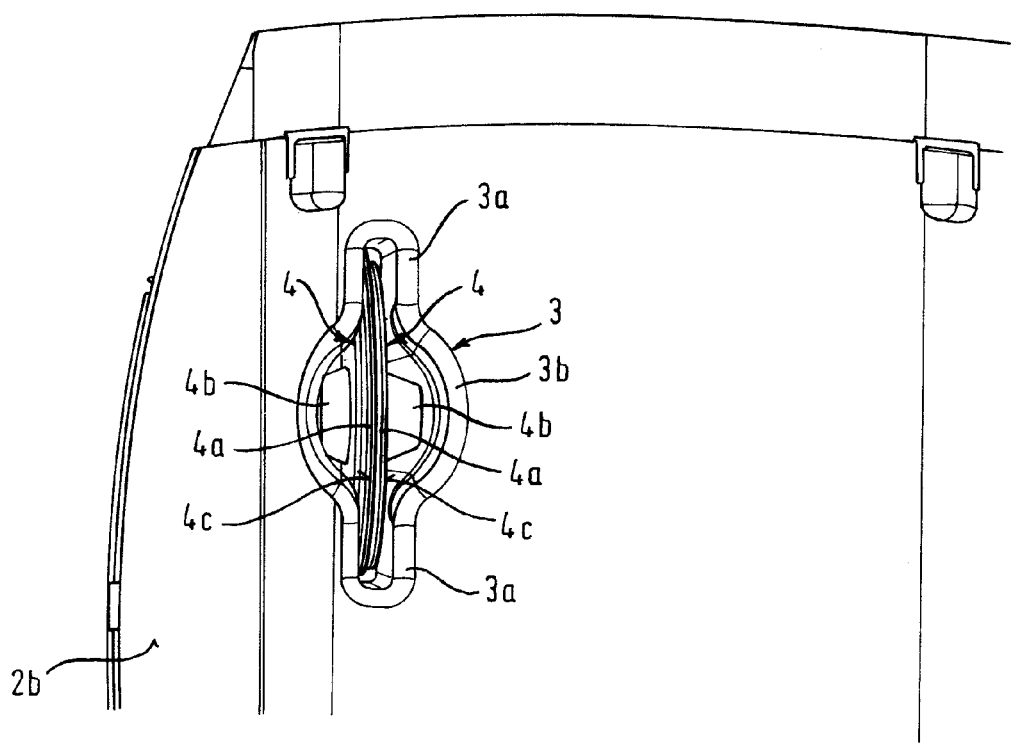
FIG. 3 shows a pocket for service disks.

FIG. 3 is a detailed illustration of the pocket 3 with two service disks 4 loaded. In principle they have the same structure as the drinks disks. They are round and have a thin, disk-shaped cover area 4a and a compact capsule area 4b. The capsule area 4b of the service disk 4 lies on an underside 4c of the service disk 4 and is smaller than the corresponding capsule area of a drinks disk. The diameter of the cover area 4a of a service disk 4 and of a drinks disk are in contrast identical, because they have to fit into the same brewing chamber 5 of a drinks machine.

The shape of the pocket 3 is adapted precisely to the shape of two service disks 4 which have their upper sides abutting one another. They slide into two edge areas 3a and a middle area 3b lying between them. The edge areas 3a are of narrow design; there is only space in them for the two thin cover areas 4b of the two service disks 4. The dimensions of the middle area 3b are adjusted precisely to the dimensions of the capsule areas 4b of two service disks 4. Drinks disks thus will not fit into the pocket 3 because their capsule area is larger.

The broadening in the middle area 3b of the pocket 3 provides space for the service disks to be removed. The full width of the pocket 3 in the middle area 3b is only occupied in the plane of the housing wall 2b by the narrow cover areas of the service disks 4a and thus still provides enough space to the right and left for conveniently gripping the service disks 4.

Since the pocket described in detail above as a holder is an exemplary embodiment, it can be modified to a large extent in customary fashion by a person skilled in the art, without going beyond the scope of the invention. In particular, the specific arrangement of the holder in the to drinks machine can be at a different position from the one described here. Likewise, the holder can be designed to be another shape if this is necessary for reasons of space or design. Furthermore, the use of the indefinite article "a" or "an" does not rule out that the features in question are also present on a multiple basis.

LIST OF REFERENCE CHARACTERS

1 Water reservoir
2 Housing
2a Front part of housing
2b Rear housing wall
2c Housing base
3 Pocket, holder
3a Edge area of the pocket
3b Middle area of the pocket
4 Service disk, service function object
4a Cover area of the service disk
4b Capsule area of the service disk
4c Underside of the service disk 4

The invention claimed is:

1. A hot beverage machine comprising:
    a brewing chamber;
    a housing;
    a component having at least one cleaning program and a de-scaling program requiring the use of a service-function object, said service-function object being a disc being disposable in said brewing chamber for carrying out at least one of said programs, the disc containing execution information for at least one of said programs;
    a holder formed in said housing, said holder being sized and shaped corresponding to a size and shape of the disc for storing the disc therein; and a housing base, a housing wall, said holder being formed in said housing wall, and a removable water reservoir disposed on said housing base directly adjacent said housing wall so that the discs in said holder are only accessible when said water reservoir is removed from said base.

2. The hot drinks machine according to claim 1, wherein the holder is formed as a closable pocket for receiving for receiving the disc.

3. The hot drinks machine according to claim 1, wherein the holder is formed as a pocket for receiving the disc.

4. The hot drinks machine according to claim 1, further comprising a water reservoir, said holder being hidden behind said water reservoir.

5. The hot drinks machine according to claim 1, wherein said holder is sized and shaped for receiving and storing two of said discs.

6. A hot drinks machine comprising;
    a component for running a cleaning program and a de-scaling program, the programs each requiring the use of at least one service function object having cleaning or descaling contents therein;
    a brewing chamber configured for receiving the at least one service function object and using the contents of the at least one service function object during execution of said at least one program;
    a housing;
    a holder formed in said housing, said holder for receiving and storing the at least one service function object prior to placement in said brewing chamber; and a housing base, a housing wall, said holder being formed in said housing wall, and a removable water reservoir disposed on said housing base directly adjacent said housing wall so that the service function objects in said holder are only accessible when said water reservoir is removed from said base.

7. The hot drinks machine according to claim 6, wherein the holder is formed as a pocket for receiving the at least one service function object.

8. The hot drinks machine according to claim 6, wherein the holder is formed as a closable pocket for receiving for receiving the at least one service function object.

9. The hot drinks machine according to claim 6, further comprising a housing base, a housing wall, said holder being formed in said housing wall, and a removable water reservoir disposed on said housing base directly adjacent said housing wall, said holder being hidden behind said water reservoir when said water reservoir is disposed on said housing base.

10. The hot drinks machine according to claim 6, wherein said holder is sized and shaped to match a size and shape of the at least one service function object.

11. A hot drinks system comprising; service function disks having contents therein; a hot drinks machine having:
- a component for running at least one of a cleaning program and a de-scaling program, the programs each requiring the use of at least one of said service function disks;
- a brewing chamber configured for receiving said service function disks and using said contents of said service function disks during execution of said at least one program;
- a housing;
- a holder formed in said housing, said holder for receiving and storing at least one of said service function disks prior to placement in said brewing chamber; and a housing base, a housing wall, said holder being formed in said housing wall, and a removable water reservoir disposed on said housing base directly adjacent said housing wall so that the service function disks in said holder are only accessible when said water reservoir is removed from said base.

\* \* \* \* \*